Sept. 1, 1970   E. M. TRAMMELL, JR   3,526,314
LITTER DISPOSAL UNIT FOR AUTOMOBILES
Filed July 12, 1968   2 Sheets-Sheet 1
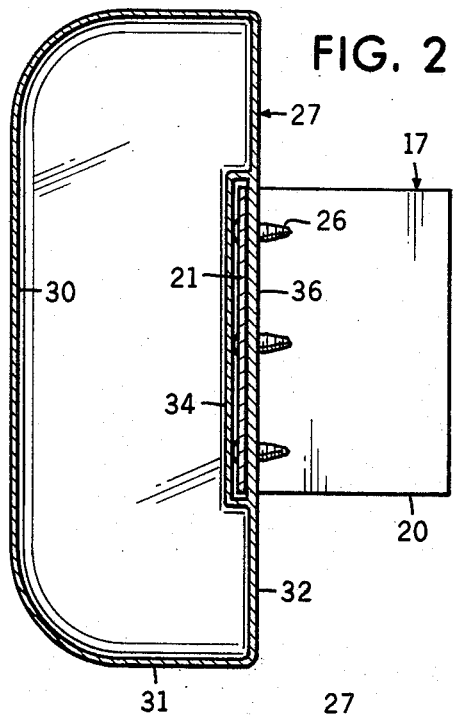
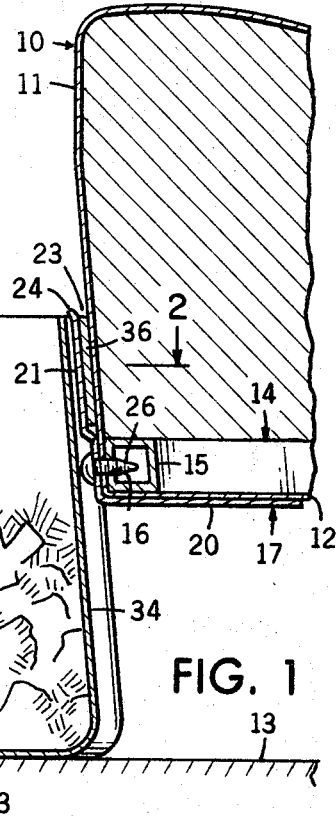
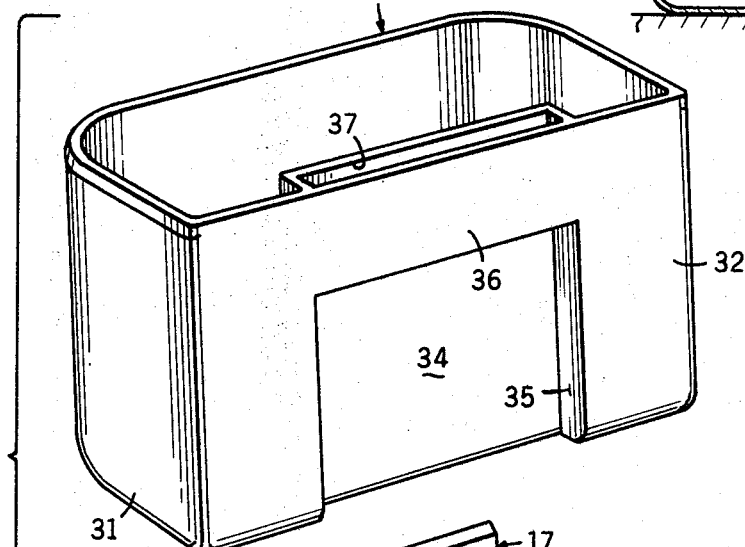
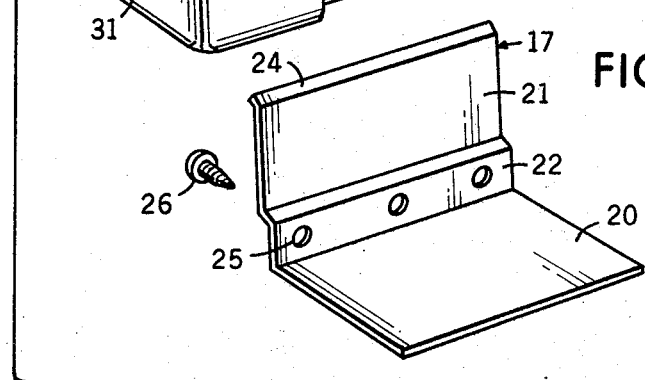
INVENTOR
EARL M. TRAMMELL, JR.
BY
Cohn and Powell
ATTORNEYS Sept. 1, 1970  E. M. TRAMMELL, JR  3,526,314
LITTER DISPOSAL UNIT FOR AUTOMOBILES
Filed July 12, 1968  2 Sheets-Sheet 2
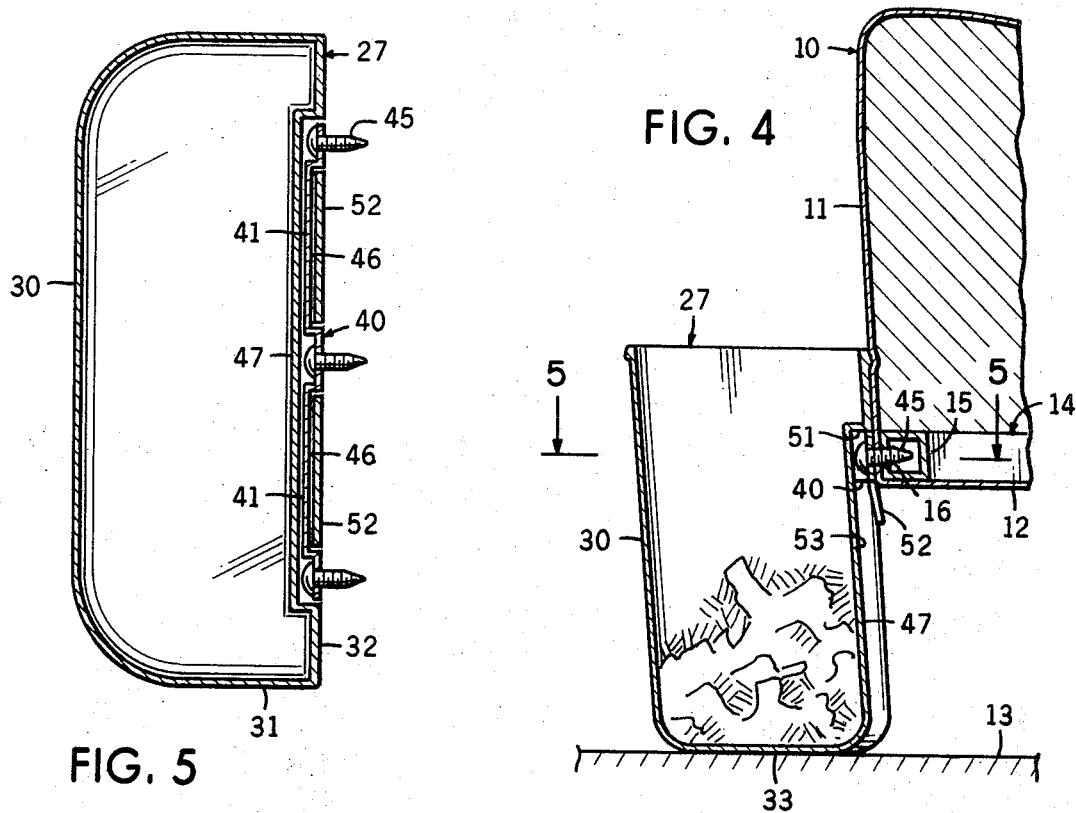
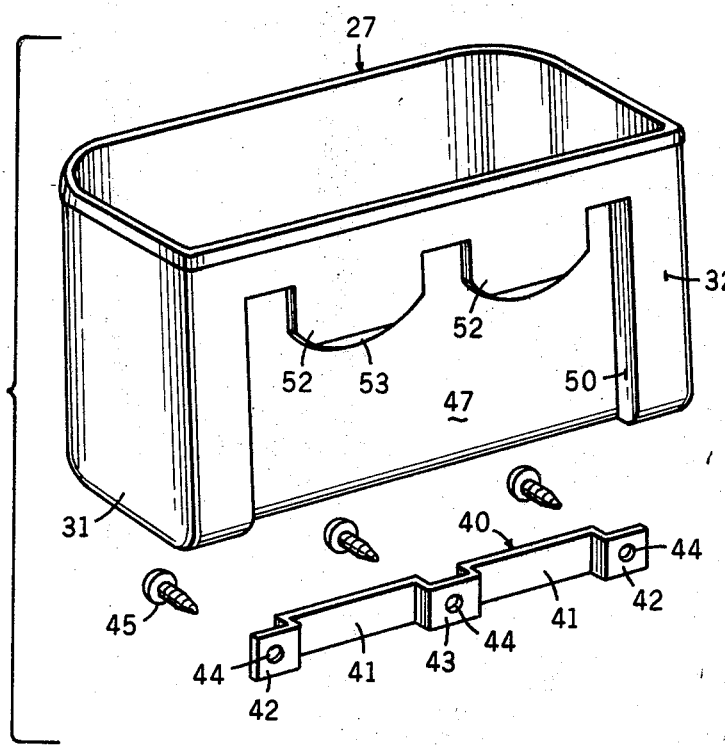
INVENTOR
EARL M. TRAMMELL, JR.
BY
Cohn and Powell
ATTORNEYS United States Patent Office 3,526,314
Patented Sept. 1, 1970

3,526,314
LITTER DISPOSAL UNIT FOR AUTOMOBILES
Earl M. Trammell, Jr., 39 Salem Estates,
Ladue, Mo. 63124
Filed July 12, 1968, Ser. No. 744,482
Int. Cl. B65d 25/24; A47c 7/62; B60n 3/08
U.S. Cl. 206—19.5
12 Claims

ABSTRACT OF THE DISCLOSURE

A litter disposal unit having an attachment means that secures a container to a frame member at the front side of an automobile seat, whereby to fasten and position the container against the front seat side. The attachment means includes a bracket provided with a top-open socket that is selectively interfitted by a flange on the rear side of the container. The frame member is located at the base of the front seat side, and is provided with holes at predetermined locations which are usually covered by the seat fabric, but which are selectively utilized in conjunction with fastening elements upon installation of the bracket to the seat. In one embodiment, the bracket is substantially L-shaped having one arm underlying the seat and the other arm overlapping the front seat side to provide the bracket socket. The flange, received in the socket, extends across a recessed rear wall portion of the container. In another embodiment, the bracket has a substantially U-shaped portion that forms the socket, while the container flange depends over and is spaced from the recessed rear wall portion of the container.

BACKGROUND OF THE INVENTION

This invention relates generally to improvements in a litter disposal unit for an automobile.

The heretofore conventional litter containers have either incorporated a gravity fit such as the common placement of the container across the transmission hump on the front seat floor, or employed attaching means for the litter container to the dashboard, kick pad and so forth, of the automobile. These latter means of attachment have necessitated different fixtures for each automobile make. Also, both the gravity and the fixed positions mentioned interfered at times with movements of the driver and passenger.

Those litter containers that rested on the seat took up seating room and diminished the occupant's comfort. Those containers that rested on the floor hindered the movement of the occupant's legs and were not always in the optimum position for usage, especially when utilized in conjunction with a movably mounted automobile front seat.

SUMMARY OF THE INVENTION

The present litter disposal unit incorporates a structural and functional relationship between the automobile seat and the litter container. When installed, the container is positioned flush against the base of the front seat, which is a preferred location for an automobile litter container. The unit includes a litter container, the seat frame and a connecting bracket, all integrally designed to provide a new and convenient means for attachment and detachment of the litter container to the automobile seat. Such a unit is simple in design and inexpensive in cost.

Upon installation of the unit, a flange on the rear side of the container interfits a positioning or holding socket formed by a bracket that is attached by screws to the seat frame in self-locating screw holes that are pre-pierced during the regular production run of the seat frame. Of course, such coacting screw holes can be readily drilled in the seat frame upon installation of the litter disposal unit to the older automobile.

One of the important advantages of the unit is that it provides the opportunity for any automobile producer to greatly increase the accessory sale of litter containers through its dealerships. It encourages the new automobile buyer, who desires a litter container in his automobile, to buy from the automobile dealer, because this unique litter disposal unit would be readily available at the dealer for a quick and easy installation. It is especially adapted for installation as a factory option, and any desirable accessory that lends itself to efficient installation at the factory, automatically enjoys an increased volume in sales. In addition, it insures an easy, sure-fit installation for the dealer, and dealer personnel are always inclined to urge the sale of trouble-free accessories.

DESCRIPTION OF THE DRAWINGS

FIG. 1 is a fragmentary cross sectional view showing the installation of the litter disposal unit to the front side of an automobile seat;

FIG. 2 is a cross sectional view of the litter disposal unit as taken on line 2—2 of FIG. 1;

FIG. 3 is an exploded perspective view of the container and attaching bracket;

FIG. 4 is a fragmentary cross sectional view of a modified embodiment of the litter disposal unit attached to the front side of an automobile seat;

FIG. 5 is a cross sectional view of a litter disposal unit as taken on line 5—5 of FIG. 4, and FIG. 6 is an exploded perspective view of the container and attaching bracket of the embodiment shown in FIGS. 4 and 5.

DESCRIPTION OF THE PREFERRED EMBODIMENTS

Referring now by characters of reference to the drawings, and first to the embodiment disclosed in FIGS. 1–3, it will be understood that the litter disposal unit is assocated with an automobile front seat generally indicated by 10 having a front side 11. As is usual, the bottom 12 of seat 10 is spaced slightly above the floor 13. The seat 10 includes an internal frame referred to by 14 which has a transverse frame member 15 extending along the front seat side 11 at the base of the seat 10. The seat frame 14 is of a box section. Although not shown, it will be readily understood that the automobile front seat 10 can be selectively adjusted forwardly or rearwardly by suitable conventional mechanism.

For reasons which will later appear, the front face of the frame member 15 is provided with a plurality (three in the embodiment shown) of regularly spaced screw holes 16. These screw holes 16 can be drilled in predetermined locations during the regular production run of the seat frame 14 during the manufacture of the seat assembly, and are preferably, although not necessarily, covered by the fabric constituting the front seat side 11. As will be explained upon later description of parts and method of installation, the screw holes 16 can be placed in the frame member 15 by the dealer or buyer.

A substantially L-shaped bracket generally indicated by 17, and best shown in FIG. 3, includes a substantially horizontal plate arm 20 and a stepped, substantially vertical plate arm 21. When assembled, the plate arm 20 underlies the seat 10 and bears against the bottom of frame member 15 for rigidity and stabilization. At the same time, a relatively narrow portion 22 of stepped plate arm 21 overlaps the base of the front seat side 11 and bears against the front face of frame member 15, while the remaining portion of the plate arm 21 extends upwardly in slightly spaced relation to the front seat side 11 to provide a top-open socket 23. The upper edge of the plate arm 21 is provided with an out-turned lip 24. The top-open socket 23 is also open at the sides. The substantially vertical plate arm 21 is resilient, tending to close the top-open socket 23.

The narrow strip portion 22 of plate arm 21 is provided with a plurality (three in the embodiment shown) of regularly spaced screw holes 25, placed in predetermined locations to correspond and align with the screw holes 16 provided in frame member 15. Screws 26 are passed through the aligned screw holes 16 and 25 to fasten the bracket 17 to the frame member 15 and to the seat 10. Of course, the fabric constituting the front seat side 11 is easily punctured by the screws 26.

The litter disposal unit includes a container 27 that is preferably constructed of plastic material. The container 27 includes a front wall 30 rounded at the corners and merging with the side walls 31 to join with a rear wall 32. The container includes a bottom wall 33.

The rear wall 32 is provided with an intermediate, recessed rear wall portion 34 extending from the bottom wall 33 to the top rim of the container 27. The recessed rear wall portion 34 includes integral, inwardly projecting side strips 35. Formed integrally with the rear wall 32 and extending across the recessed rear wall portion 34 at the top of the container 27, is a transverse flange 36. The container flange 36 is spaced from the recessed rear wall portion 34 to provide a container socket 37 therebetween.

To attach the container 27 to the bracket 17, the container flange 36 is simply inserted into the top-open socket 23 provided by bracket 17, the container flange 36 resiliently spreading the plate arm 21 for a close fit. Of course, the plate arm 21 extends upwardly into the container socket 37. Preferably, the inclined lip 24 slightly overlaps the top edge of the container flange 36 when such flange 36 is fully inserted and tends to preclude accidental or unintentional withdrawal of the flange 36 from the bracket 17. The resilient plate arm 21 of bracket 17 tends to urge the rear container wall 32 tightly against the base of the front seat side 11.

The container flange 36 is located at the top of the container 27, and the top-open socket 23 of the plate arm 21 is dimensioned to container flange 36 so that the bottom wall 33 of container 27 seats lightly on the floor 13. When the seat 10 is adjusted forwardly or backwardly, the litter container 27 will move with the seat 10 and will ride on the floor 13.

To empty the container 27, the occupant simply reaches down and lifts up on the container 27 to withdraw the container flange 36 from the top-open socket 23, and consequently disengage the flange 36 from the bracket 17. The container 27 can be emptied and readily attached again to the bracket 17 in the manner previously described.

By locating the litter container 27 at the base of the front seat 10, the container 27 is located in an unobtrusive location that does not offend the esthetic appearance of the automobile interior and does not interfere with the occupant's movements, and yet is in a position that is readily accessible to the occupant for usage under all conditions and in all adjusted seat positions.

The embodiment of the litter disposal unit disclosed in FIGS. 4–6 incorporates structure similar to the embodiment previously described with respect to FIGS. 1–3, and accordingly, corresponding parts will be provided with corresponding reference numbers wherever possible for sake of clarity.

For example, the automobile front seat 10 includes a front side 11 and a bottom 12. The seat frame 14 includes a transverse frame member 15 located at the base of the seat 10 and extending transversely of the front seat side 11. This frame member 15 is provided with a plurality (three in the embodiment shown) of regularly spaced screw holes 16 in its front face. The fabric constituting the front seat side 11 will usually cover the screw holes 16 when the screw holes 16 are drilled at the factory.

The bracket 40, constituting the attachment means, of this embodiment is an elongate strip including a pair of substantially U-shaped portions 41. The bracket 40 includes a pair of end tabs 42 and an intermediate strip portion 43, each of which is provided with a screw hole 44. These screw holes 44 are alignable with the compatible screw holes 16 located in predetermined locations in the frame member 15.

To attach the bracket 40 to the seat 10, the bracket 40 is located over the front face of frame member 15 with the bracket screw holes 44 in register with the screw holes 16, and then screws 45 are threadedly passed through the associated screw holes 16 and 44 to secure the bracket 40 to the frame member 15 and to seat 10. The screws 45 puncture the fabric of the front seat side 11 easily. Of course, it will be understood that if the screw holes 16 are not provided at the factory, such screw holes 16 can be drilled in the frame member 15 at the appropriate locations by the dealer or by the buyer at the time of installation. The substantially U-shaped strip portions 41 are spaced from the front seat wall 11 to provide top-open sockets 46.

The container 27 of this embodiment is similar to the container 27 of the FIGS. 1–3 embodiment in that the container 27 includes a front wall 30 having rounded corners merging with side walls 31 to join with a rear wall 32. The rear container wall 32 includes an intermediate recessed rear wall portion 47 extending upwardly from the bottom wall 33 and terminating short of the upper rim. This recessed rear wall portion 47 is defined by integral side strips 50 and an integral top strip 51.

A pair of flanges 52 are formed integrally with the rear container wall 32, the container flanges 52 depending over the recesessed wall portion 47 in spaced relation to provide a container socket 53 therebetween. The container flanges 52 are of a size to interfit the top-open sockets 46 provided by the substantially U-shaped bracket portions 41, the flanges 52 being laterally spaced to permit the passage of the intervening strip portion 43. The lower ends of the container flanges 52 are provided with slightly bent lips 53 which tend to retain the container flanges 52 in operative engagement with the bracket 40 upon installation.

To install the container 27, the occupant merely places the rear container wall 32 against the front seat side 11, and inserts the container flanges 52 into the sockets 46 provided by the U-shaped bracket portions 41. The outwardly turned lips 53 overlap the lower edge of the bracket 40 and tend to maintain the connection of the container 27 to the bracket 40. When the flanges 52 and sockets 46 are interfitted, the rear container wall 32 is urged against the base of the front seat side 11.

Of course, upon insertion of the container flanges 52 into the top-open sockets 46, the substantially U-shaped bracket portions 41 will move upwardly into the container socket 53. Preferably, the depth of the bracket 40 closely approximates the depth of the recessed rear wall portion 47 so that the substantially U-shaped bracket portions 41 engage the recessed rear wall portion 47 for the purpose of rigidity and stabilization. The structural relationship and locations of the flanges 52 and bracket 40 enable the container bottom 33 to rest lightly on the floor 13 when the container 27 is securely attached. The container 27 will ride on the floor 13 when the seat is moved upon seat adjustment.

To detach the container 27, the occupant merely reaches down and lifts the container 27 to withdraw the container flanges 52 from the sockets 46 provided by bracket 40. The container 27 can be emptied and readily attached for further usage.

I claim as my invention:
1. In a litter disposal unit for a vehicle:
   (a) a vehicle seat including a front side, the seat having a frame member adjacent the front seat side,
   (b) a litter container,
   (c) attachment means securing the container to the frame member whereby to fasten and position the container to and against the front seat side,
(d) the frame being located substantially at the base of the front seat side, and being provided with holes at predetermined locations,
(e) the seat including a fabric covering the holes, and
(f) the attachment means including fastening elements coacting with the holes upon installation of the unit to the seat.

2. In a litter disposal unit for a vehicle:
(a) a vehicle seat including a front side, the seat having a frame member adjacent the front seat side,
(b) a litter container,
(c) attachment means securing the container to the frame member whereby to fasten and position the container to and against the front seat side,
(d) the attachment means including a bracket secured to the frame member, the bracket being provided with a top-open socket, and
(e) the container including a flange on its rear side selectively interfitting the bracket socket to fasten the container to the bracket and seat.

3. In a litter disposal unit for a vehicle:
(a) a vehicle seat including a front side, the seat having a frame member adjacent the front seat side,
(b) a litter container,
(c) attachment means securing the container to the frame member whereby to fasten and position the container to and against the front seat side,
(d) the frame member being located substantially at the base of the front seat side,
(e) the attachment means including a bracket secured to the frame member, the bracket having a portion spaced from the front seat side to provide a top-open socket therebetween, and
(f) the container including a flange on its rear side adjacent the top of the container, the flange selectively interfitting the bracket socket to fasten the container to the bracket and seat.

4. In a litter disposal unit for a vehicle:
(a) a vehicle seat including a front side, the seat having a frame member adjacent the front seat side,
(b) a litter container,
(c) attachment means securing the container to the frame member, whereby to fasten and position the container to and against the front seat side,
(d) the attachment means including a substantially L-shaped bracket, one arm of which underlies the seat and the other arm of which overlaps the front seat side and the frame member, the said other bracket arm being partially spaced from the front seat side to provide a top-open socket,
(e) fastening means securing the bracket to the frame member, and
(f) the container including a rear flange selectively interfitting the top-open bracket socket to fasten the container to the bracket and seat.

5. A litter disposal unit as defined in claim 4, in which:
(g) the frame member is located substantially at the base of the front seat side, and
(h) the said other bracket arm that underlies the seat, bears against the frame member for rigidity and stabilization.

6. In a litter disposal unit for a vehicle:
(a) a vehicle seat including a front side, the seat having a frame member adjacent the front seat side,
(b) a litter container,
(c) attachment means securing the container to the frame member, whereby to fasten and position the container to and against the front seat side,
(d) the attachment means including a bracket secured to the frame member, the bracket being provided with a top-open socket, and
(e) the container having a stepped rear wall that includes:
(1) an intermediate rear wall portion recessed inwardly of the container, and
(2) a flange extending across the recessed rear wall portion in spaced relation, the flange selectively interfitting the bracket socket to bring the rear container against the front seat side.

7. A litter disposal unit as defined in claim 6, in which:
(f) the transverse flange is integral at its ends with the rear container wall, and
(g) the bracket includes an arm overlapping the front seat side and spaced from the front seat side to provide the top-open socket that is open at its sides to receive the transverse flange between the integral flange ends.

8. A litter disposal unit as defined in claim 6, in which:
(f) the transverse flange and recessed rear wall portion provide a container socket that is open at top and bottom, and
(g) the bracket includes an upwardly extending resilient arm spaced from the front seat side to provide the bracket socket, the bracket arm selectively interfitting the container socket when the flange interfits the bracket socket.

9. A litter disposal unit as defined in claim 8, in which:
(h) the transverse flange and recessed rear wall portion overlap, the recessed rear wall portion and the transverse flange extending upwardly to the top of the container.

10. A litter disposal unit as defined in claim 8, in which:
(h) the depending flange and recessed rear wall portion are spaced to provide a container socket therebetween, and
(i) the bracket includes a substantially U-shaped portion selectively receiving the depending flange and extending into the container socket.

11. A litter disposal unit as defined in claim 8, in which:
(h) a plurality of said laterally adjacent flanges depend over and are spaced from the recessed wall portion, and
(i) the bracket includes an elongate strip having a plurality of adjacent U-shaped portions, each of which selectively receives one of the depending flanges.

12. In a litter disposal unit for a vehicle:
(a) a vehicle seat including a front side, the seat having a frame member adjacent the front seat side,
(b) a litter container,
(c) attachment means securing the container to the frame member whereby to fasten and position the container to and against the front seat side,
(d) the attachment means including a bracket secured to the frame member, the bracket being provided with a top-open socket, and
(e) the container having a stepped rear well that includes:
(1) an intermediate rear wall portion recessed inwardly of the container, and
(2) a flange depending over and spaced from the recessed rear wall portion, the flange selectively interfitting the bracket socket to bring the rear container wall against the front seat side.

References Cited

UNITED STATES PATENTS 3,014,759   12/1961   Bing.

JOSEPH R. LECLAIR, Primary Examiner

J. M. CASKIE, Assistant Examiner

U.S. Cl. X.R.

220—18; 224—42.42; 297—191